US012196005B1

(12) United States Patent
Eid et al.

(10) Patent No.: US 12,196,005 B1
(45) Date of Patent: Jan. 14, 2025

(54) DOOR STRIKE

(71) Applicant: Kindoo LLP, Kelowna (CA)

(72) Inventors: Gilbert Eid, Beit Meri (LB); Michael Chaftari, Dubai (AE)

(73) Assignee: Kindoo LLP, Kelowna (CA)

( * ) Notice: Subject to any disclaimer, the term of this patent is extended or adjusted under 35 U.S.C. 154(b) by 0 days.

(21) Appl. No.: 18/776,843

(22) Filed: Jul. 18, 2024

(51) Int. Cl.

| | |
|---|---|
| ***E05B 63/24*** | (2006.01) |
| ***E05B 15/02*** | (2006.01) |
| ***E05B 47/00*** | (2006.01) |

(52) U.S. Cl.
CPC .......... *E05B 63/244* (2013.01); *E05B 15/022* (2013.01); *E05B 47/0046* (2013.01); *E05B 2047/0081* (2013.01)

(58) Field of Classification Search
CPC .... E05B 15/02; E05B 15/0205; E05B 15/021; E05B 15/022; E05B 47/02; E05B 47/0046; E05B 47/0047; E05B 47/0696; E05B 2047/0073; E05B 2047/0074; E05B 2047/0081; E05B 63/128; E05B 63/244; E05B 63/248
See application file for complete search history.

(56) References Cited

U.S. PATENT DOCUMENTS

| | | | | |
|---|---|---|---|---|
| 7,021,684 | B2 * | 4/2006 | Orbeta | E05B 47/0046 292/201 |
| 7,438,335 | B1 * | 10/2008 | Uyeda | E05B 47/0046 292/341.15 |
| 8,047,585 | B1 * | 11/2011 | Peabody | E05B 47/0046 292/341.15 |
| 9,702,167 | B2 * | 7/2017 | Liao | E05B 47/0046 |
| 10,697,202 | B2 * | 6/2020 | Geringer | E05B 47/0603 |
| 11,536,054 | B2 * | 12/2022 | Chen | E05B 47/0012 |
| 11,542,726 | B2 * | 1/2023 | Moen | E05B 47/0047 |
| 11,885,154 | B2 * | 1/2024 | Moroyoqui | E05B 65/0025 |
| 2022/0098899 | A1 * | 3/2022 | Chang | E05B 47/0046 |

* cited by examiner

*Primary Examiner* — Christopher J Boswell
(74) *Attorney, Agent, or Firm* — Georgiy L. Khayet

(57) ABSTRACT

A door strike is provided. The door strike includes a plate, a first keeper and a second keeper mounted onto the plate, the first keeper and the second keeper to stop a door latch when the first keeper and the second keeper are prevented from rotating, a first follower designed to engage the first keeper, a second follower designed to engage the second keeper, a first bolt designed to prevent the first follower from being rotated, and a second bolt designed to prevent the second follower from being rotated, one or more parts designed to move the first bolt and the second bolt, and an electric actuator designed to cause, via the one or more parts the first bolt to disengage the first keeper to allow the first keeper to rotate and the second bolt to disengage the second keeper to allow the second keeper to rotate.

20 Claims, 8 Drawing Sheets

DOOR STRIKE

TECHNICAL FIELD

This disclosure generally relates to the field of door opening devices and, more particularly, to door strikes.

BACKGROUND

Door strikes are used to ensure security in the door locking systems in various structures, such as, for example, commercial buildings, condominiums, and houses. Typically, a door strike is an assembly installed in a door frame to receive and secure the door latch of a door lock. The door strike can be remotely controlled by using electric current to switch from a locked mode to an unlocked mode, thereby releasing the door latch, so the door can be open. Existing door strikes consume a significant amount of power to maintain the door strikes in the unlocked position. If a battery is used to provide electric current to a door strike, consumption of the electric power may lead to rapid draining of the battery as well as shortening the lifespan of the battery. Additionally, most of the existing door strikes require making cuts in the door frame prior to the installation. In some cases, the door frame may not have sufficient space to fit the door strike or cutting the door frame can be impractical. Therefore, a slim, surface mounted strike is needed to be installed in the situations where the door frame cannot be cut.

BRIEF SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to an example embodiment, a door strike is provided. The door strike includes a plate designed to be mounted onto a door frame, a first keeper pivotally mounted onto the plate, and a second keeper pivotally mounted onto the plate. The first keeper and the second keeper are designed to stop a door latch when the first keeper and the second keeper are prevented from rotating. The door strike includes a first follower pivotally mounted onto the plate and designed to engage the first keeper and a second follower pivotally mounted onto the plate and designed to engage the second keeper. The door strike includes a first bolt designed to prevent the first follower from being rotated, thereby preventing the first keeper from being rotated while the first bolt is engaging the first follower. The door strike includes a second bolt designed to prevent the second follower from being rotated, thereby preventing the second keeper from being rotated while the second bolt is engaging the second follower. The door strike includes one or more parts designed to move the first bolt and the second bolt and an electric actuator. The electric actuator is designed, upon being powered by electric current, to cause, via the one or more parts, the first bolt to disengage the first keeper to allow the first keeper to rotate. The electric actuator causes, via the one or more parts, the second bolt to disengage the second keeper to allow the second keeper to rotate. Upon disconnecting the electric current powering the electric actuator, the electric actuator keeps, without consumption of electric power, the first bolt and the first keeper disengaged and the second bolt and the second keeper disengaged.

According to another example embodiment, a method for manufacturing a door strike is provided. The method includes providing a plate designed to be mounted onto a door frame. The method includes pivotally mounting a first keeper and a second keeper onto the plate. The first keeper and the second keeper are designed to stop a door latch when the first keeper and the second keeper are prevented from rotating. The method includes pivotally mounting a first follower onto the plate. The first follower is designed to engage the first keeper. The method includes pivotally mounting a second follower onto the plate. The second follower is designed to engage the second keeper. The method includes providing a first bolt designed to prevent the first follower from being rotated, thereby preventing the first keeper from being rotated while the first bolt is engaging the first follower. The method includes providing a second bolt designed to prevent the second follower from being rotated, thereby preventing the second keeper from being rotated while the second bolt is engaging the second follower. The method includes providing one or more parts designed to move the first bolt and the second bolt and an electric actuator. The electric actuator is designed, upon being powered by electric current, to cause, via the one or more parts, the first bolt to disengage the first keeper to allow the first keeper to rotate. The electric actuator causes, via the one or more parts, the second bolt to disengage the second keeper to allow the second keeper to rotate. Upon disconnecting the electric current that powers the electric actuator, the electric actuator keeps, without consumption of electric power, the first bolt and the first keeper disengaged, and the second bolt and the second keeper disengaged.

Other example embodiments of the disclosure and aspects will become apparent from the following description taken in conjunction with the following drawings.

BRIEF DESCRIPTION OF THE SEVERAL VIEWS OF THE DRAWINGS

Embodiments are illustrated by way of example and not limitation in the figures of the accompanying drawings, in which like references indicate similar elements and in which.

DETAILED DESCRIPTION

Figure 1A:
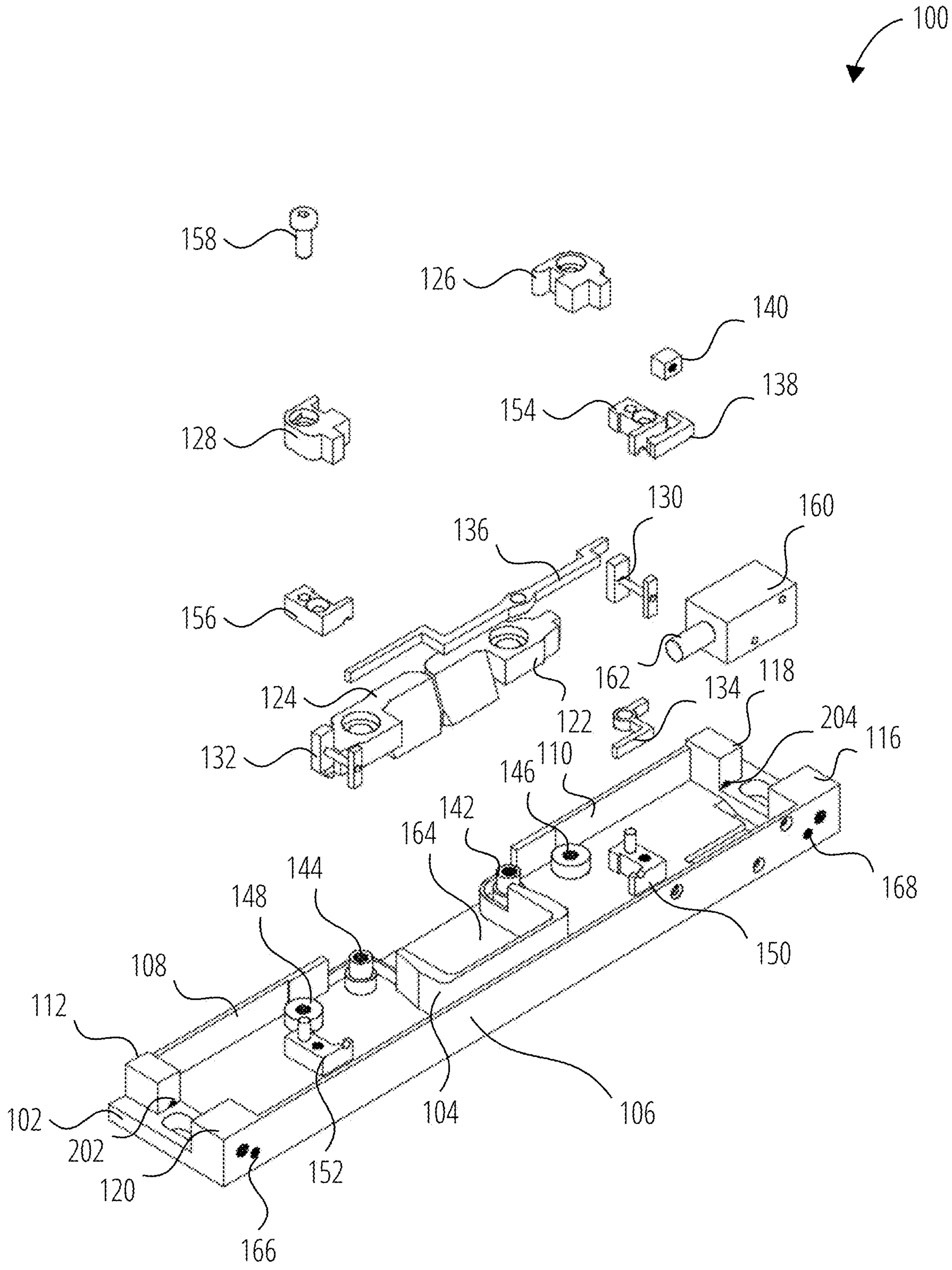
FIG. 1A shows an exploded view of a door strike, according to an example embodiment of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to door strikes, and specifically to electric door strikes. Certain embodiments of the present disclosure may provide a door strike that operates in either a locked mode or unlocked mode. When in the locked mode, the door strike may secure the door latch of a door lock, so the door cannot be opened. When in the unlocked mode, the door strike may release the door latch of a door lock, thereby allowing the door to be open. Existing electric door strikes consume power during the whole period of the door strikes being in the unlocked mode (these door strikes known as fail secure type of strikes) or in the locked mode (these door strikes known as fail safe type of strikes).

Unlike the existing door strikes, the door strike of the present disclosure consumes the electric current solely when switching from the locked mode to the unlocked mode and vice versa. Once switched from the locked mode to the unlocked mode, the door strike of the present disclosure does not need to consume any electricity. Accordingly, embodiments of the present disclosure may allow to increase the lifespan of power supplies providing the electric current to the door strike.

According to an example embodiment, an example door strike includes a plate designed to be mounted onto a door frame. The door strike includes a first keeper pivotally mounted onto the plate and a second keeper pivotally mounted onto the plate. The first keeper and the second keeper are designed to stop a door latch when the first keeper and the second keeper are prevented from rotating. The door strike includes a first follower pivotally mounted onto the plate and designed to engage the first keeper. The door strike includes a second follower pivotally mounted onto the plate and designed to engage the second keeper. The door strike includes a first bolt designed to prevent the first follower from being rotated, thereby preventing the first keeper from being rotated while the first bolt is engaging the first follower. The door strike includes a second bolt designed to prevent the second follower from being rotated, thereby preventing the second keeper from being rotated while the second bolt is engaging the second follower. The door strike includes one or more parts designed to move the first bolt and the second bolt. The door strike includes an electric actuator, for example a latching solenoid. The electric actuator is designed upon being powered by electric current, to cause, via the one or more parts, the first bolt to disengage the first keeper to allow the first keeper to rotate and the second bolt to disengage the second keeper to allow the second keeper to rotate, thereby unlocking the first keeper and the second keeper. When unlocked, the first keeper and the second keeper enable the door latch to move through the first keeper and the second keeper, thereby allowing the door to be open. Upon disconnecting the electric current that powers the electric actuator, the first bolt and the first keeper are kept disengaged and the second bolt and the second keeper are kept disengaged without consumption of electric power.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1A shows an exploded view of a door strike 100, according to an example embodiment of the present disclosure. The door strike 100 may include a plate 102, an internal wall 104, a wall 106 (also referred to as an external wall), a wall 108, a wall 110, a block 112, a block 116, a block 118, a block 120, a keeper 122 (also referred to as a first keeper), a keeper 124 (also referred to as a second keeper), a follower 126 (also referred to as a first follower), a follower 128 (also referred to as second follower), a bolt 130 (also referred to as a first bolt), a bolt 132 (also referred to as a second bolt), a lever 134 (also referred to as a first lever), a lever 136 (also referred to as a second lever), a rod 138, a rod holder 140, a keeper pivot 142, a keeper pivot 144, a follower pivot 146, a follower pivot 148, a bolt support base 150, a bolt support base 152, a bolt support cover 154 (also referred to as a first cover), a bolt support cover 156 (also referred to as a second cover), a screw 158, and an electric actuator 160. Electric actuator 160 may include a plunger 162. Example electric actuator 160 may include a latching solenoid 400 described in FIG. 4 and FIG. 5. Door strike 100 may include springs shown in FIG. 1B.

Figure 1B:
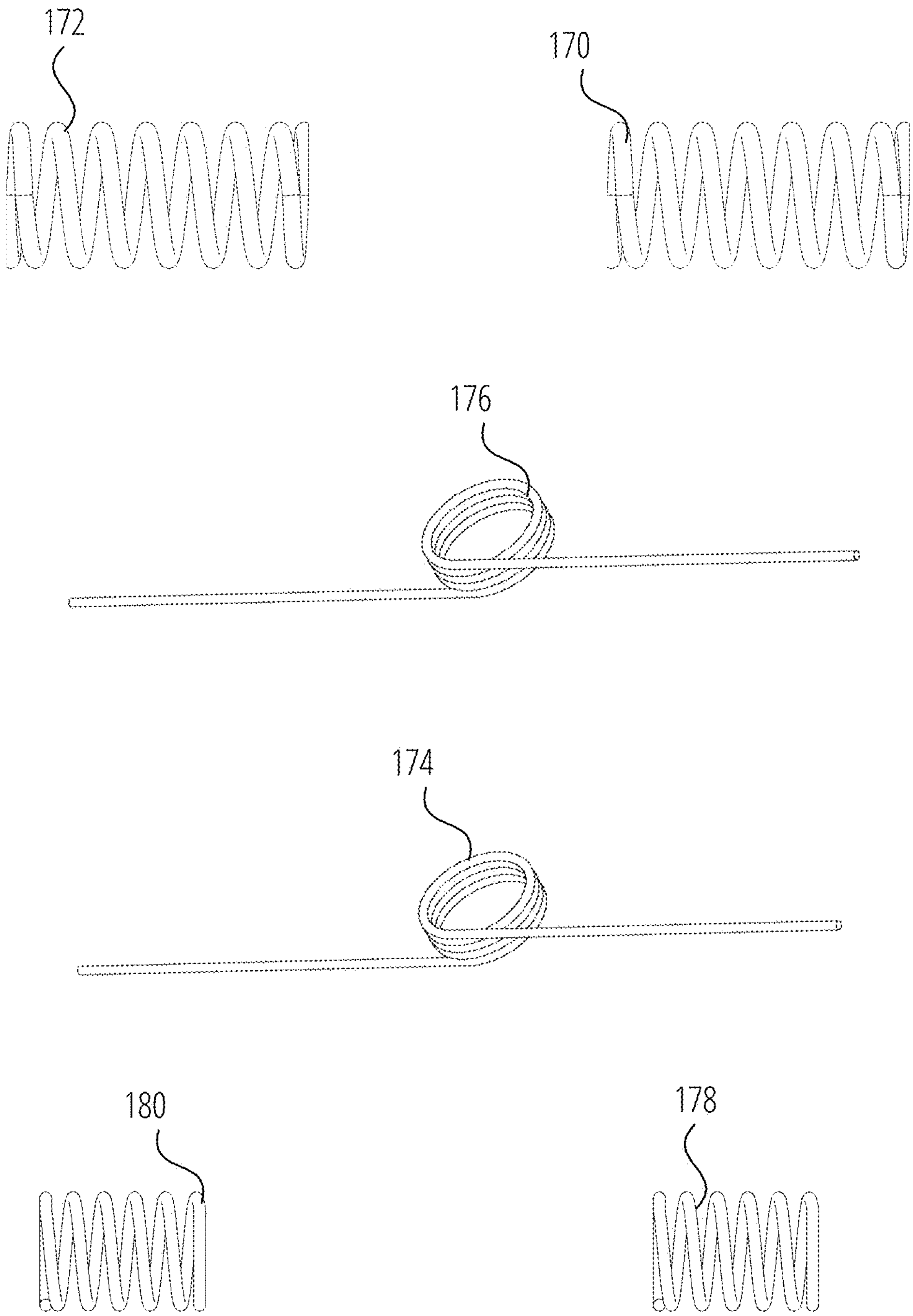
FIG. 1B shows springs of the door strike, according to an example embodiment of the present disclosure.

FIG. 1B shows springs of a door strike 100, according to an example embodiment of the present disclosure. Door strike 100 may include a compression spring 170, a compression spring 172, a torsion spring 174, a torsion spring 176, a compression spring 178, and a compression spring 180. Referring now to both FIG. 1A and FIG. 1B, keeper 122 is designed to be placed on keeper pivot 142 and keeper 124 is designed to be placed onto keeper pivot 144. Thus, internal wall 104, keeper 122, and keeper 124 form cavity 164 for receiving a door latch. Torsion spring 174 is designed to be placed around an axis of rotation of keeper 122. Torsion spring 176 is designed to be placed around an axis of rotation of keeper 124. When door strike 100 in a locked mode, keeper 122 and keeper 124 are locked in a position parallel to the wall 108 and wall 110. When door strike 100 in an unlocked mode, keeper 122 and keeper 124 can rotate to release the door latch from cavity 164. After the door latch leaves cavity 164, torsion spring 174 returns keeper 122 to the position parallel to the wall 108 and wall 110. Similarly, torsion spring 176 returns keeper 124 to the position parallel to the wall 108 and wall 110.

Follower 126 is designed to be placed onto follower pivot 146. Follower 126 may engage keeper 122. As seen in FIG. 1A, keeper 122 includes a tooth and follower 126 includes a recess for accepting the tooth. Thus, keeper 122 and follower 126 can mutually rotate when door strike 100 in unlocked mode. When door strike 100 in locked mode, follower 126 is locked to prevent keeper 122 from rotating. Compression spring 178 is designed to be placed between wall 110 and a side of follower 126 to push follower 126 away from wall 110.

Follower 128 is designed to be placed onto follower pivot 148. Follower 128 may engage keeper 124. As seen in FIG. 1A, keeper 124 includes a tooth and follower 128 includes a recess for accepting the tooth. Thus, keeper 124 and follower 128 can mutually rotate when door strike 100 in unlocked mode. When door strike 100 in locked mode, follower 128 is locked to prevent keeper 124 from rotating. Compression spring 180 is designed to be placed between wall 108 and a side of follower 128 to push follower 128 away from wall 108.

Bolt 130 may include a shaft, the first boss at the first end of the shaft and the second boss at the second end of the shaft. Bolt 130 is designed to be placed onto bolt support base 150 and covered by bolt support cover 154. Bolt support base 150 has a notch. Bolt support cover 154 has another notch to form an opening for accepting the shaft of the bolt 130. Bolt 130 may slide through the opening and engage follower 126 via the first boss. The follower 126 has a tooth for engaging the first boss of bolt 130. Compression spring 170 can be placed around the shaft of bolt 130 to push the bolt 130 towards follower 126. The second boss of bolt 130 engages the right arm (the short arm) of the lever 134.

Bolt 132 may also include a shaft, the first boss at the first end of the shaft and the second boss at the second end of the shaft. Bolt 132 is designed to be placed onto bolt support base 152 and covered by bolt support cover 156. Bolt support base 152 has a notch. Bolt support cover 156 has another notch to form an opening for accepting the shaft of the bolt 132. Bolt 132 may slide through the opening and engage follower 128 via the first boss. The follower 128 has a tooth for engaging the first boss of bolt 132. Compression spring 172 can be placed around the shaft of bolt 132 to push the bolt 132 towards follower 128. The second boss of bolt 132 engages the left arm of the lever 136.

The rod holder 140 can be attached to the wall 106. The rod holder may include an opening. The rod 138 can be inserted into the opening of the rod holder 140. The right end of rod 138 can be engaged with the plunger 162 of electric actuator 160. The left end of the rod 138 can be engaged with the left arm (the long arm) of the lever 134 at the bending point of the left arm of lever 136.

The lever 136 and lever 134 can be mounted to pivot points disposed on plate 102. In FIG. 1A, the pivot points used for mounting the lever 136 and lever 134 are obscured by wall 106. Keeper 122, keeper 124, follower 126, follower 128, bolt support cover 154, bolt support cover 156, lever 134, and lever 136 can be fixed to corresponding pivots using screws similar to screw 158 depicted in FIG. 1A. Blocks 112, 116, 120, and 118 are designed to ensure rigidity to walls 108, 106, and 110. Additionally, blocks 112, 116, 120, and 118 may include screw holes 202, 168, 166, and 204, respectively, in order to affix a strike cover (not shown) to screw strike 100 with screws. The strike cover is designed to cover the interior of door strike 100. Operations of the door strike 100 are described in connection with FIG. 2, FIG. 3A, and FIG. 3B.

Figure 2:
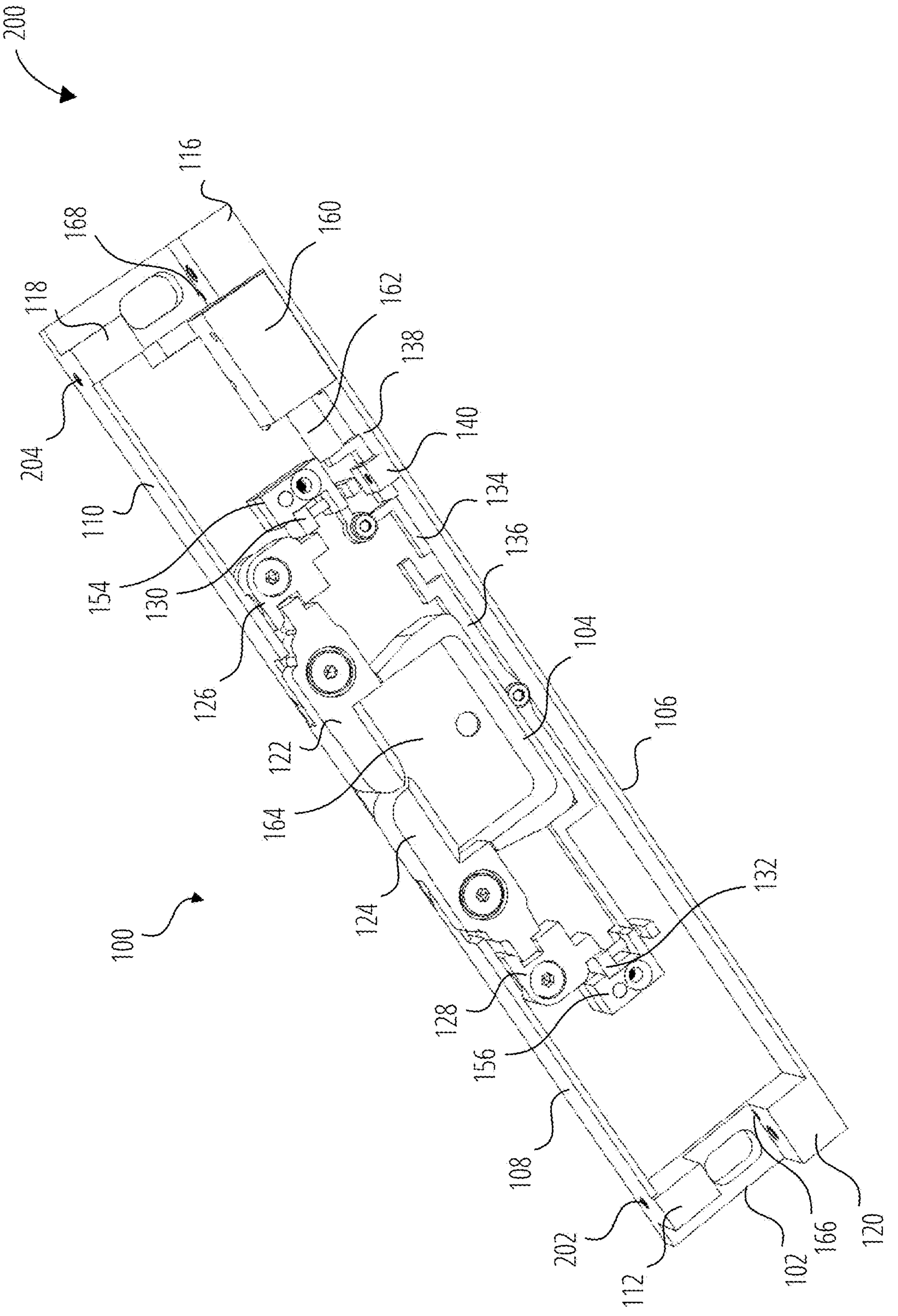
FIG. 2 shows an elevated view of the door strike in a locked mode, according to an example embodiment of the present disclosure.

FIG. 2 shows an elevated view 200 of the door strike 100 in a locked mode, according to an example embodiment of the present disclosure. FIG. 2 depicts plate 102, wall 108, wall 106, wall 110, internal wall 104, block 120, block 118, block 112, block 116, screw hole 166, screw hole 204, screw hole 202, screw hole 168, keeper 124, keeper 122, cavity 164, follower 128, follower 126, bolt 130, bolt 132, rod 138, rod holder 140, bolt support cover 154, bolt support cover 156, lever 136, lever 134, electric actuator 160, and plunger 162.

Figure 3A:
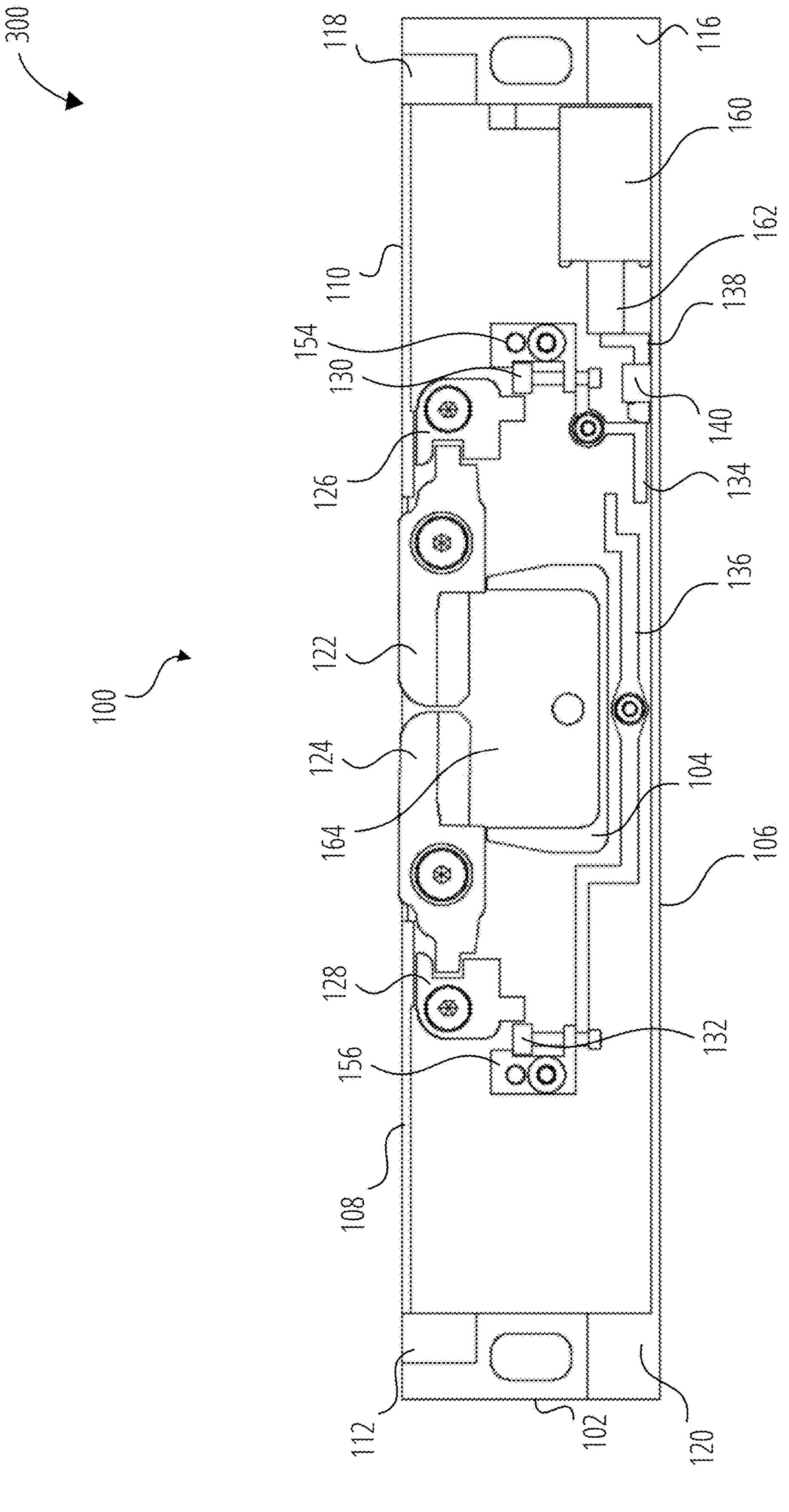
FIG. 3A shows a top view of the door strike in a locked mode, according to an example embodiment of the present disclosure.

FIG. 3A shows a top view 300 of the door strike 100 in a locked mode, according to an example embodiment of the present disclosure. FIG. 3A depicts plate 102, wall 108, wall 106, wall 110, internal wall 104, block 120, block 118, block 112, block 116, keeper 124, keeper 122, cavity 164, follower 128, follower 126, bolt 130, bolt 132, rod 138, rod holder 140, bolt support cover 154, bolt support cover 156, lever 136, lever 134, electric actuator 160, and plunger 162.

In locked mode shown in FIG. 2 and FIG. 3A, follower 126 and follower 128 cannot rotate because they are blocked by bolt 130 and bolt 132, respectively. Because follower 126 and follower 128 cannot rotate, keeper 122 and keeper 124 are also prevented from rotation. Therefore, door latch located in cavity 164 cannot push and pass through the keeper 122 and keeper 124 to enable opening the door.

When electric actuator 160 is powered by an electric current, plunger 162 of electric actuator 160 pushes the rod 138 towards lever 134. As a result, lever 134 rotates clockwise at a predetermined angle, for example 20 degrees. When electric actuator 160 is disconnected from the electric current, the plunger 162 remains moved towards rod 138, causing the rod 138 to remain moved left and lever 134 to remain rotated. Electric actuator 160 may hold the position of plunger 162 without consumption of electric power.

When lever 134 is rotated clockwise at the predetermined angle, the right arm of lever 134 causes bolt 130 to move away from and disengage follower 126. As a result, follower 126 becomes unlocked and enables keeper 122 to rotate around corresponding pivot point. The left arm of lever 134 engages with the right arm of lever 136 to cause lever 136 to rotate counterclockwise. The left arm of lever 136 moves bolt 132 away from follower 128 to cause bolt 132 to disengage follower 128. As a result, follower 128 becomes unlocked and enables keeper 124 to rotate around corresponding pivot point. Thus, the door strike is switched into unlocked mode.

Figure 3B:
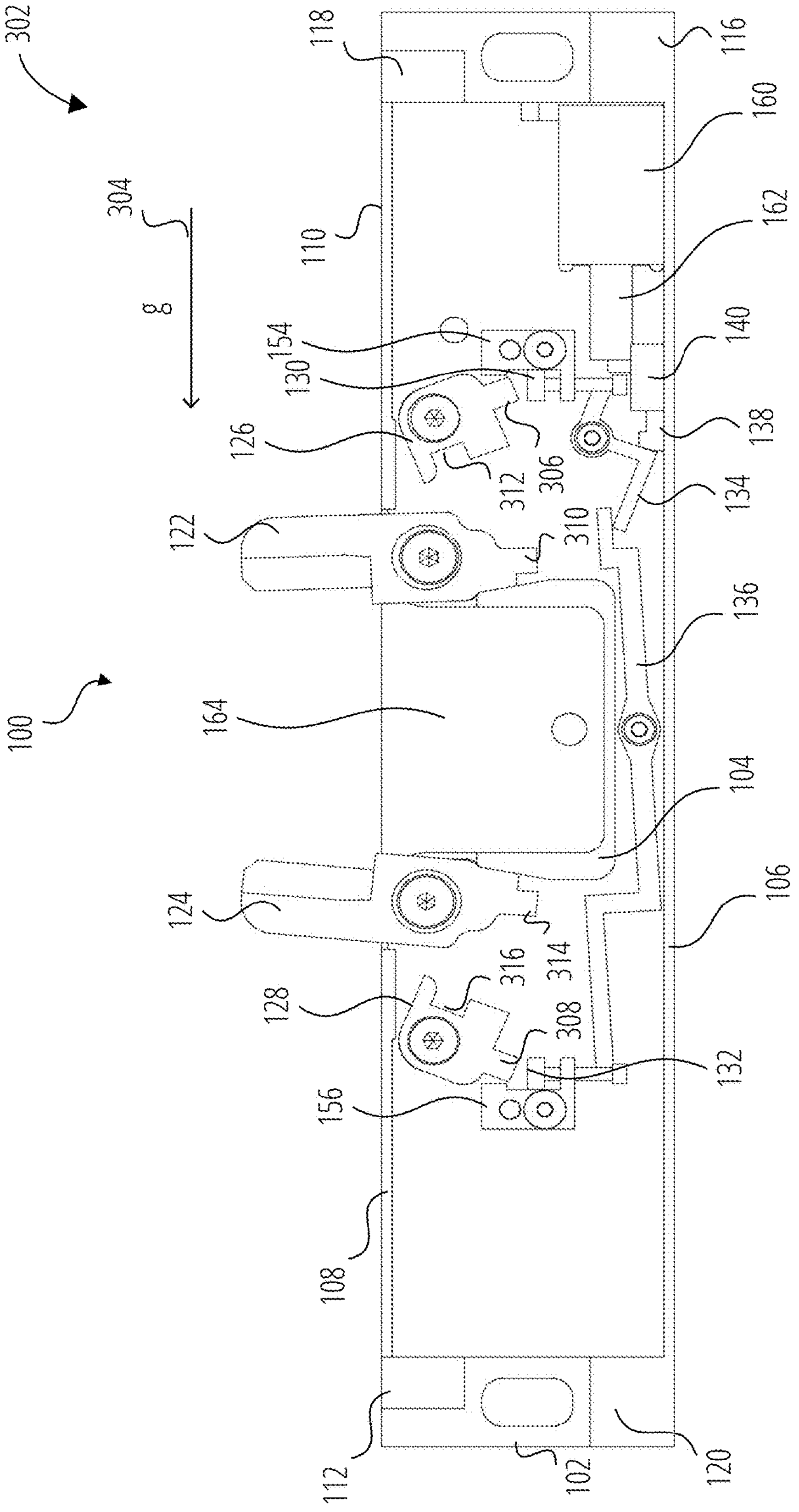
FIG. 3B shows a top view of the door strike in an unlocked mode, according to an example embodiment of the present disclosure.

FIG. 3B shows a top view 302 of door strike 100 in unlocked mode, according to an example embodiment of the present disclosure. FIG. 3B depicts plate 102, wall 108, wall 106, wall 110, internal wall 104, block 120, block 118, block 112, block 116, keeper 124, keeper 122, cavity 164, follower 128, follower 126, bolt 130, bolt 132, rod 138, rod holder 140, bolt support cover 154, bolt support cover 156, lever 136, lever 134, electric actuator 160, and plunger 162.

A door latch held in cavity 164 can push keeper 122 and keeper 124 when the door is opening. Keeper 122 and keeper 124 can rotate to release the door latch from cavity 164. After the door latch leaves cavity 164, one or more springs (not shown) return keeper 122 and keeper 124 to the position parallel to wall 108 and wall 110. When keeper 122 returns to the position, follower 126 rotates accordingly, so tooth 306 of follower 126 returns to the position allowing bolt 130 to be placed between follower 126 and bolt support base 150. Similarly, when keeper 124 returns to the position parallel to wall 108 and wall 110, follower 128 rotates accordingly, so tooth 308 of follower 128 returns to the position allowing bolt 132 to be placed between follower 128 and bolt support base 152.

As seen in FIG. 3B, keeper 122 has a tooth 310 to engage recess 312 of follower 126. To allow tooth 310 to engage recess 312, follower 126 needs to be rotated away from wall 110 by a predetermined angle. Compression spring 178 (shown in FIG. 1B) can hold follower 126 in the rotated position and prevent follower 126 from rotating back to wall

110 by a force of gravity vector 304. Without compression spring 178, follower 126 could rotate back to wall 110 because the right part of follower is heavier than the left part. The force of compression spring 178 can be stronger than the force of gravity vector 304 but weaker than the force of torsion spring 174 designed to return keeper 122 in the position parallel to wall 110.

Similarly, keeper 124 has a tooth 314 to engage recess 316 of follower 128. To allow tooth 314 to engage recess 316, the follower 128 needs to be rotated away from wall 108 by a predetermined angle. Compression spring 180 (shown in FIG. 1B) can hold follower 128 in the rotated position and prevent follower 128 from rotating back to wall 108. Compression spring 180 needs to be placed between wall 108 and the side of follower 128 because door strike 100 can be installed in a door frame in the position opposite to the one shown in FIG. 3B. In this position, follower 128 could rotate back to wall 108 due to the force of gravity vector 304 because the right part of follower is heavier than the left part. The force of compression spring 180 can be stronger that the force of gravity vector 304 but weaker than the force of torsion spring 176 designed to return keeper 124 in the position parallel to wall 108.

To return door strike 100 into locked mode, a further electric current can be provided to electric actuator 160. The further electric current can be opposite to the electric current used to unlock the door strike 100. When electric actuator 160 is powered by the further electric current, plunger 162 moves away from rod 138 to stop rod 138 pushing lever 136. When electric actuator 160 is disconnected from the further electric current, the plunger 162 remains moved away from rod 138 to the original position. Electric actuator 160 may hold the original position of plunger 162 without consumption of electric power.

Compression spring 170 (shown in FIG. 1B) disposed around the shaft of bolt 130 causes bolt 130 to move towards follower 126. When bolt 130 returns in the position between the tooth of follower 126 and bolt support cover 154, the follower 126 and keeper 122 become locked. At the same time, bolt 130 causes lever 134 to rotate counterclockwise. The left arm of lever 134 pushes rod 138 towards plunger 162 and disengages the right arm of lever 136.

Compression spring 172 (shown in FIG. 1B) disposed around the shaft of bolt 132 causes bolt 132 to move towards follower 128. When bolt 132 returns in the position between the tooth of follower 128 and bolt support cover 156, the follower 128 and keeper 124 become locked. At the same time, bolt 132 causes lever 136 to rotate clockwise.

Figure 4:
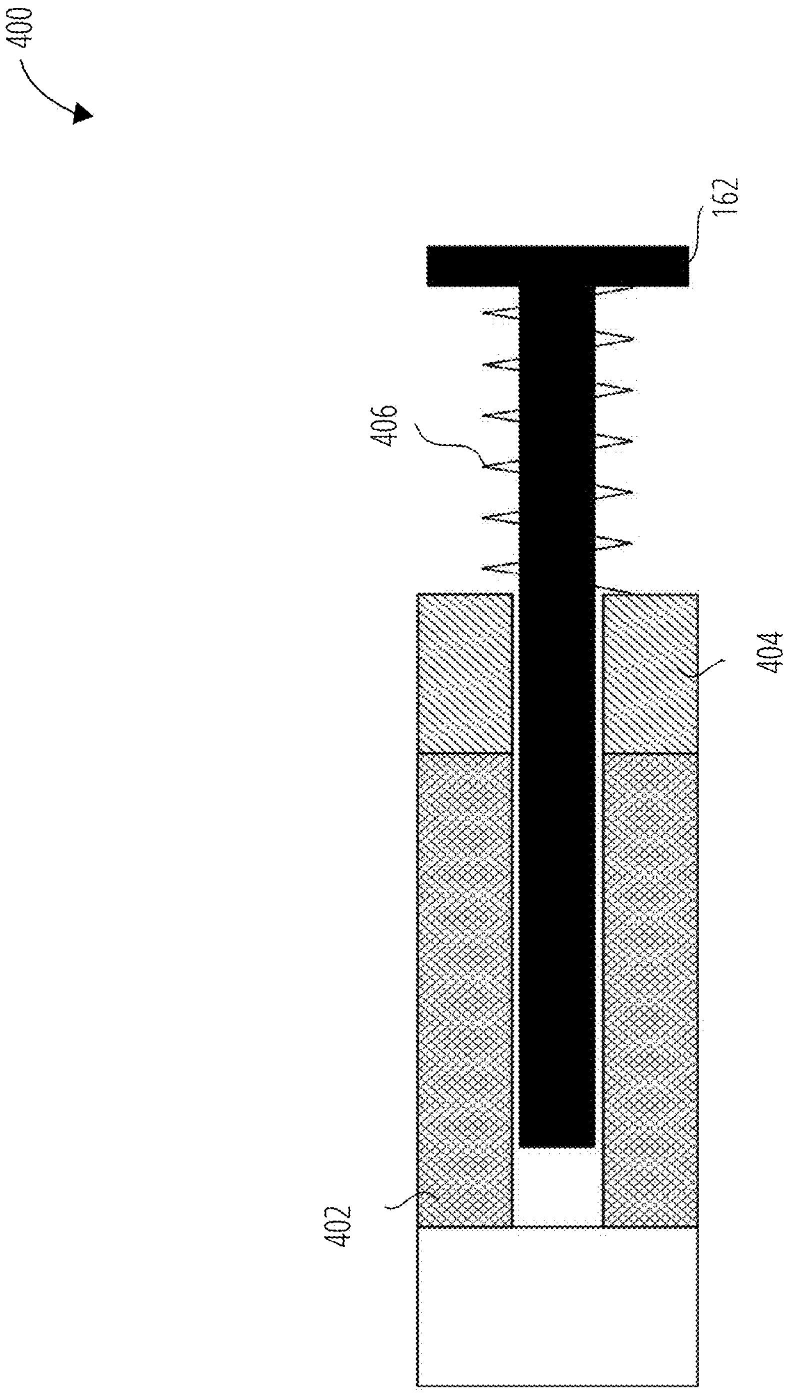
FIG. 4 is a schematic cross-section view of a latching solenoid in an activated mode, according to some example embodiments.

FIG. 4 is a schematic cross-section view of a latching solenoid 400 in an activated mode, according to some example embodiments. Latching solenoid 400 can be used as electric actuator 160 (shown in FIGS. 1A, 2, 3A, and 3B) to switch door strike 100 (shown in FIG. 1A-3) from a locked mode to an unlocked mode. Latching solenoid 400 may include coil 402, permanent magnet 404, plunger 162, and spring 406. The plunger 162 be made of metal and can slide along cavity formed by the coil 402 and permanent magnet 404. The magnetic field of permanent magnet 404 generates a pull force that pulls plunger 162 towards coil 402 and towards rod 138 (shown in FIGS. 1A, 2, 3A, and 3B).

Coil 402, when powered by electric current used to unlock door strike 100, pushes plunger 162 towards permanent magnet 404 and towards rod 138, thereby rotating lever 136 (shown in FIGS. 1A, 2, 3A, and 3B) clockwise. Spring 406 pushes plunger 162 away from the cavity of coil 402 and towards rod 138. After plunger 162 is pushed as shown in FIG. 4, the coil 402 is no longer powered by electric current. The position of the plunger 162 is held by the push force of the spring 406 because the push force of the spring 406 is stronger than the pull force generated by permanent magnet 404. This is made possible by the fact that the force exercised by the permanent magnet 404 drops very quickly as the plunger 162 moves away from the cavity formed by coil 402 and permanent magnet 404.

Figure 5:
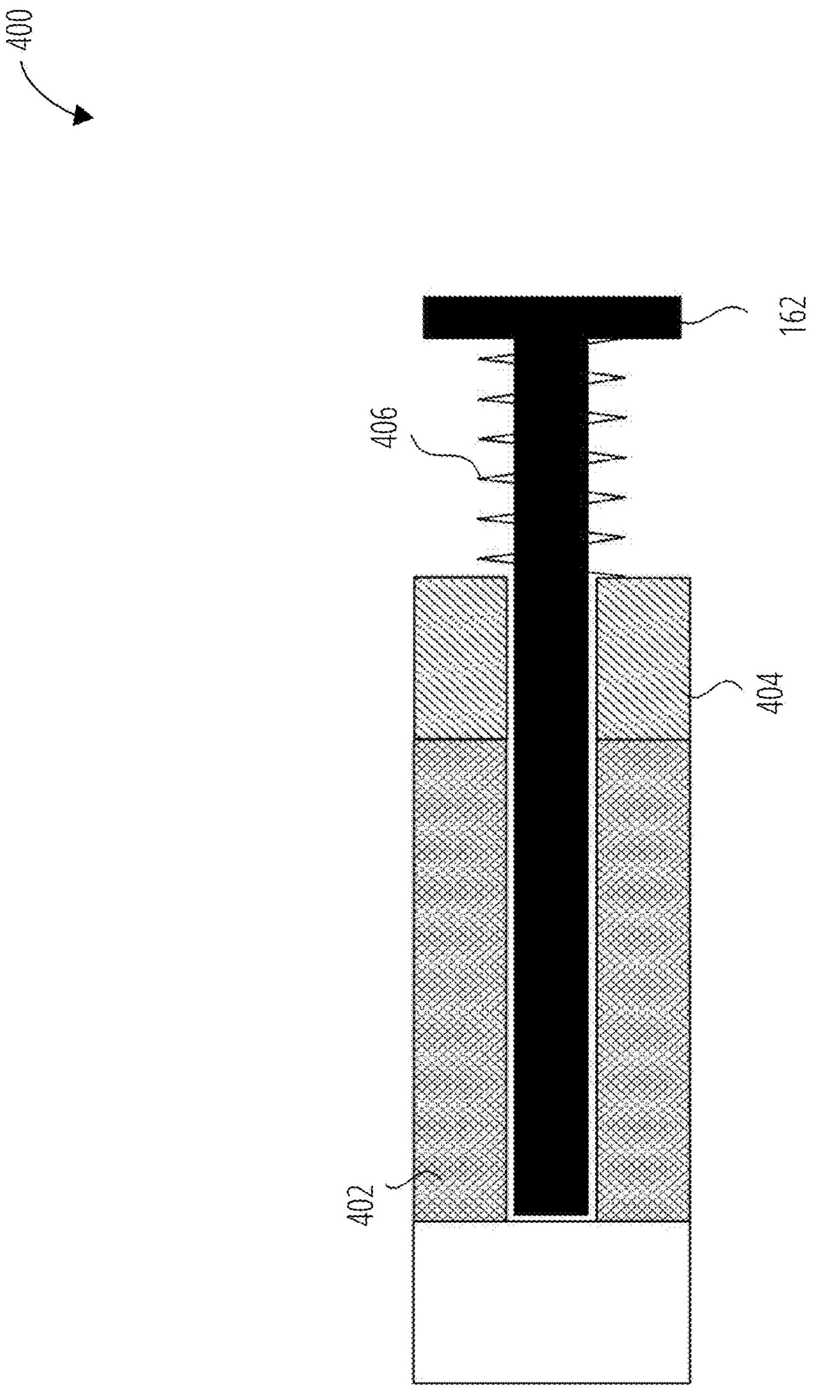
FIG. 5 is a schematic cross-section view of a latching solenoid in a deactivated mode, according to some example embodiments.

FIG. 5 is a schematic cross-section view of a latching solenoid 400 in a deactivated mode, according to some example embodiments. Latching solenoid 400 can be used as electric actuator 160 (shown in FIGS. 1A, 2, 3A, and 3B) to switch door strike 100 (shown in FIGS. 1A, 2, 3A, and 3B) from an unlocked mode to a locked mode. Latching solenoid 400 may include coil 402, permanent magnet 404, plunger 162, and spring 406. Coil 402, when powered by further electric current of the direction opposite to the direction of electric current used to unlock door strike 100, pulls plunger 162 away from the rod 138 (shown in FIGS. 1A, 3A, and 3B), thereby allowing bolt 130 and bolt 132 (shown in FIGS. 1A, 2, 3A, and 3B) to engage and lock follower 126 and follower 128 (shown in FIGS. 1A, 2, 3A, and 3B), respectively.

After plunger 162 is pulled back towards coil 402, as shown in FIG. 5, coil 402 is no longer powered by further electric current. The position of plunger 162 is held by the pull force generated by permanent magnet 404 because in this position of plunger 162 the pull force generated by permanent magnet 404 is stronger than the push force of spring 406.

Thus, to transition the latching solenoid 400 from one mode to another to switch door strike 100 from one mode to another, the coil 402 can be powered with a short pulse. This may increase the lifetime of battery powering the latching solenoid 400.

Figure 6:
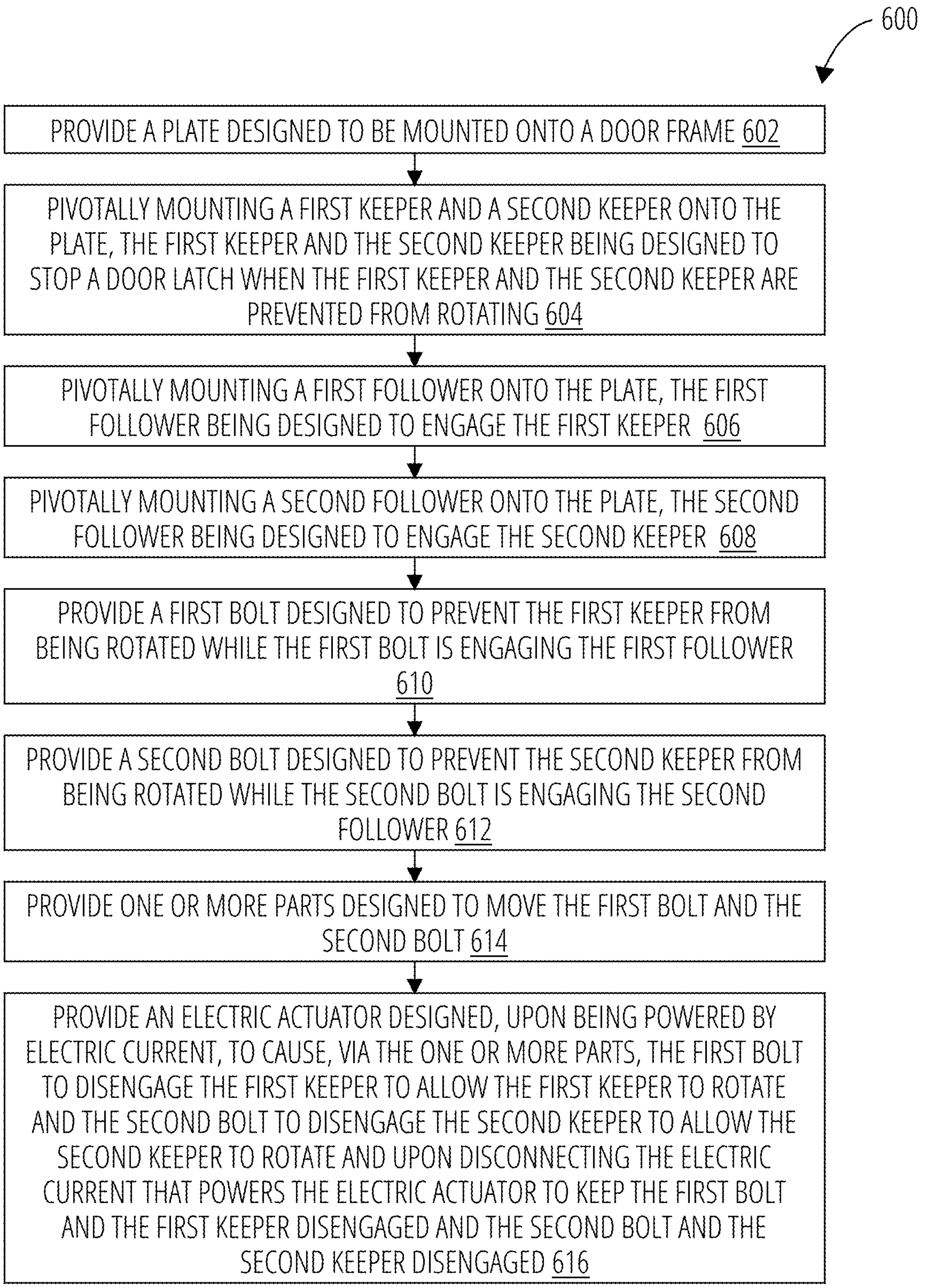
FIG. 6 illustrates a method for manufacturing a door strike, according to an example embodiment of the present disclosure.

FIG. 6 illustrates method 600 for manufacturing a door strike, according to an example embodiment of the present disclosure. In some embodiments, the operations of method 600 may be combined, performed in parallel, or performed in a different order. Method 600 may also include additional or fewer operations than those illustrated.

In block 602, method 600 may include providing a plate designed to be mounted onto a door frame. In block 604, method 600 may include pivotally mounting a first keeper and a second keeper onto the plate. The first keeper and the second keeper are designed to stop a door latch when the first keeper and the second keeper are prevented from rotating.

In block 606, method 600 may include pivotally mounting a first follower onto the plate. The first follower is designed to engage the first keeper. In block 608, method 600 may include pivotally mounting a second follower onto the plate. The second follower is designed to engage the second keeper.

In block 610, method 600 may include providing a first bolt. The first bolt is designed to prevent the first follower from being rotated while the first bolt is engaging the first follower. In block 612, method 600 may include providing a second bolt. The second bolt is designed to prevent the second follower from being rotated while the second bolt is engaging the second follower.

In block 614, method 600 may include providing one or more parts designed to move the first bolt and the second bolt.

In block 616, method 600 may include providing an electric actuator. The electric actuator may include a latching solenoid. The electric actuator is designed, upon being powered by electric current, to cause, via the one or more parts, the first bolt to disengage the first keeper and the second bolt to disengage the second keeper. When the first bolt and the first follower are disengaged, the first keeper is allowed to rotate. When the second bolt and the second follower are disengaged, the second keeper is allowed to rotate. Upon disconnecting the electric current powering the electric actuator, the electric actuator keeps the first bolt and the first keeper disengaged and the second bolt and the second keeper disengaged.

The electric actuator is designed, upon being powered by a further electric current, to cause the first bolt to engage the first keeper, thereby disallowing the first keeper from rotating, and the second bolt to engage the second keeper, thereby disallowing the second keeper from rotating. Upon disconnecting the further electric current, powering the electric actuator, the electric actuator keeps the first bolt and the first keeper engaged and the second bolt and the second keeper engaged.

The one or more parts include a first lever engaging the first bolt and a rod engaging the first lever. The electric actuator includes a plunger designed to push the rod towards the first lever, thereby causing the first lever to rotate in a first direction and to disengage the first bolt from the first follower. When the plunger moves away from the rod, the first lever rotates in a second direction, the second direction being opposite to the first direction, thereby allowing the first bolt to engage the first follower.

The one or more parts include a second lever engaging the second bolt. When the first lever rotates in the first direction, the first lever engages the second lever to cause the second lever to move the second bolt away from the second follower, thereby disengaging the second bolt and the second follower. Upon disengaging the first lever from the second lever, the second bolt moves towards the second follower to engage the second follower.

Method 600 may include attaching an internal wall to the plate such that the first keeper, the second keeper, and the internal wall form a cavity for receiving the door latch. Method 600 may include attaching an external wall to the plate. The second lever is at least partially disposed between the internal wall and the external wall. Method 600 may include attaching a rod holder to the external wall. The rod holder is designed to restrict movement of the rod.

Method 600 may include attaching a first lever cover to the plate. The first lever cover is designed to restrict movement of the first bolt. Method 600 may include attaching a second cover to the plate. The second cover is designed to restrict movement of the second bolt.

Method 600 may include attaching a wall to the plate and disposing a first spring between the first wall and the first follower. The first spring is designed to rotate the first follower away from the wall when the first keeper is rotated from the original position to a rotated position and disengages the first follower. Method 600 may include providing a second spring designed to return the first keeper from the rotated position to the original position. A first force of the first spring is weaker than a second force of the second spring, thereby allowing the first keeper to rotate back to the first wall when the first keeper returns from the rotated position to the original position and engages the first follower.

Thus, a door strike is described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A door strike including:
- a plate designed to be mounted onto a door frame;
- a first keeper pivotally mounted onto the plate and a second keeper pivotally mounted onto the plate, the first keeper and the second keeper being designed to stop a door latch when the first keeper and the second keeper are prevented from rotating;
- a first follower pivotally mounted onto the plate and designed to engage the first keeper;
- a second follower pivotally mounted onto the plate and designed to engage the second keeper;
- a first bolt designed to prevent the first keeper from being rotated while the first bolt is engaging the first follower;
- a second bolt designed to prevent the second keeper from being rotated while the second bolt is engaging the second follower;
- one or more parts designed to move the first bolt and the second bolt; and
- an electric actuator configured to engage and disengage the one or more parts, the electric actuator being designed, upon being powered by electric current, to cause, via the one or more parts:
  - the first bolt to disengage the first keeper to allow the first keeper to rotate; and
  - the second bolt to disengage the second keeper to allow the second keeper to rotate; and wherein:
  - upon disconnecting the electric current that powers the electric actuator:
    - the first bolt and the first keeper are kept disengaged to allow the first keeper to rotate; and
    - the second bolt and the second keeper are kept disengaged to allow the second keeper to rotate.

2. The door strike of claim 1, wherein the electric actuator is designed,
- upon being powered by a further electric current, to cause:
  - the first bolt to engage the first follower, thereby preventing the first keeper from rotating; and
  - the second bolt to engage the second follower, thereby preventing the second keeper from rotating; and
  - upon disconnecting the further electric current, powering the electric actuator to keep:
  - the first bolt and the first keeper engaged; and
  - the second bolt and the second keeper engaged.

3. The door strike of claim 1, wherein the electric actuator includes a latching solenoid.

4. The door strike of claim 1, wherein:
- the one or more parts include:
  - a first lever engaging the first bolt; and
  - a rod engaging the first lever; and
- the electric actuator includes a plunger designed to push the rod towards the first lever, thereby causing the first lever to rotate in a first direction and to disengage the first bolt from the first follower.

5. The door strike of claim 4, wherein when the plunger moves away from the rod, the first lever rotates in a second direction, the second direction being opposite to the first direction, thereby allowing the first bolt to engage the first follower.

6. The door strike of claim 4, wherein:
- the one or more parts includes a second lever engaging the second bolt; and
- when the first lever rotates in the first direction, the first lever engages the second lever to cause the second lever to move the second bolt away from the second follower, thereby disengaging the second bolt and the second follower.

7. The door strike of claim 6, wherein upon disengaging the first lever from the second lever, the second bolt moves towards the second follower to engage the second follower.

8. The door strike of claim 1, further including:
- a wall attached to the plate; and
- a first spring disposed between the wall and the first follower, the first spring being designed to rotate the first follower away from the wall when the first keeper is rotated from an original position to a rotated position and disengages the first follower.

9. The door strike of claim 8, further comprising a second spring designed to return the first keeper from the rotated position to the original position.

10. The door strike of claim 9, wherein a first force of the first spring is weaker than a second force of the second spring, thereby allowing the first keeper to rotate back to the wall when the first keeper returns from the rotated position to the original position and engages the first follower.

11. A method for manufacturing a door strike, the method comprising:
- providing a plate designed to be mounted onto a door frame;
- pivotally mounting a first keeper and a second keeper onto the plate, the first keeper and the second keeper being designed to stop a door latch when the first keeper and the second keeper are prevented from rotating;
- pivotally mounting a first follower onto the plate, the first follower being designed to engage the first keeper;
- pivotally mounting a second follower onto the plate, the second follower being designed to engage the second keeper;
- providing a first bolt designed to prevent the first keeper from being rotated while the first bolt is engaging the first follower;
- providing a second bolt designed to prevent the second keeper from being rotated while the second bolt is engaging the second follower;
- providing one or more parts designed to move the first bolt and the second bolt; and
- providing an electric actuator configured to engage and disengage the one or more parts, the electric actuator being designed, upon being powered by electric current, to cause, via the one or more parts:
  - the first bolt to disengage the first keeper to allow the first keeper to rotate; and
  - the second bolt to disengage the second keeper to allow the second keeper to rotate; and wherein:
  - upon disconnecting the electric current that powers the electric actuator:
    - the first bolt and the first keeper are kept disengaged to allow the first keeper to rotate; and
    - the second bolt and the second keeper are kept disengaged to allow the second keeper to rotate.

12. The method of claim 11, wherein the electric actuator is designed,
- upon being powered by a further electric current, to cause:
  - the first bolt to engage the first follower, thereby disallowing the first keeper from rotating; and
  - the second bolt to engage the second follower, thereby disallowing the second keeper from rotating; and
  - upon disconnecting the further electric current, powering the electric actuator to keep:
  - the first bolt and the first keeper engaged; and
  - the second bolt and the second keeper engaged.

13. The method of claim 11, wherein the electric actuator includes a latching solenoid.

14. The method of claim 11, wherein:
- the one or more parts include:
  - a first lever engaging the first bolt; and
  - a rod engaging the first lever; and
- the electric actuator includes a plunger designed to push the rod towards the first lever, thereby causing the first lever to rotate in a first direction and to disengage the first bolt from the first follower.

15. The method of claim 14, wherein when the plunger moves away from the rod, the first lever rotates in a second direction, the second direction being opposite to the first direction, thereby allowing the first bolt engage the first follower.

16. The method of claim 14, wherein:
- the one or more parts includes a second lever engaging the second bolt; and
- when the first lever rotates in the first direction, the first lever engages the second lever to cause the second lever to move the second bolt away from the second follower, thereby disengaging the second bolt and the second follower.

17. The method of claim 16, wherein upon disengaging the first lever from the second lever, the second bolt moves towards the second follower to engage the second follower.

18. The method of claim 16, further comprising:
- attaching a wall to the plate; and
- disposing a first spring between the wall and the first follower, the first spring being designed to rotate the first follower away from the wall when the first keeper is rotated from an original position to a rotated position and disengages the first follower.

19. The method of claim 18, further comprising providing a second spring designed to return the first keeper from the rotated position to the original position.

20. The method of claim 19, wherein a first force of the first spring is weaker than a second force of the second spring, thereby allowing the first keeper to rotate back to the wall when the first keeper returns from the rotated position to the original position and engages the first follower.

* * * * *